(12) United States Patent
Ostwald et al.

(10) Patent No.: US 7,184,242 B1
(45) Date of Patent: Feb. 27, 2007

(54) SELF-CONTAINED ROBOTICS MODULE FOR STORAGE LIBRARY

(75) Inventors: Timothy C. Ostwald, Louisville, CO (US); Joseph Paul Manes, Arvada, CO (US); Daniel J. Plutt, Superior, CO (US); Jon Benson, Superior, CO (US)

(73) Assignee: Storage Technology Corporation, Louisville, CO (US)

(*) Notice: Subject to any disclaimer, the term of this patent is extended or adjusted under 35 U.S.C. 154(b) by 475 days.

(21) Appl. No.: 10/727,782

(22) Filed: Dec. 4, 2003

(51) Int. Cl.
*G11B 15/675* (2006.01)

(52) U.S. Cl. .................................................. 360/92
(58) Field of Classification Search .................... None
See application file for complete search history.

(56) References Cited

U.S. PATENT DOCUMENTS

| 5,253,246 | A | 10/1993 | Leonhardt et al. |
| 5,285,333 | A | 2/1994 | Barr et al. |
| 5,455,810 | A | 10/1995 | Luffel |
| 5,544,146 | A | 8/1996 | Luffel et al. |
| 5,546,366 | A * | 8/1996 | Dang .......................... 360/92 |
| 5,870,245 | A | 2/1999 | Kersey et al. |
| 5,940,356 | A | 8/1999 | Toumbas |
| 6,309,162 | B1 | 10/2001 | White |
| 6,441,991 | B2 | 8/2002 | Ostwald et al. |
| 6,515,822 | B1 | 2/2003 | White et al. |

* cited by examiner

*Primary Examiner*—Robert S. Tupper
(74) *Attorney, Agent, or Firm*—Brooks Kushman P.C.

(57) ABSTRACT

A storage library includes cells supported within a frame for holding media elements. A robot assembly is operable for moving toward the cells and manipulating media elements held by the cells. The robot is containable within a module which is removably mountable to the frame to provide modular replacement and removal of the robot from the frame. The robot is contained within the module as the module is mounted to the frame and moves out from the module to move toward the cells and manipulate media elements held by the cells while the module is mounted to the frame. The module is removably dismounted out of the frame while the robot is contained within the module to provide the modular removal of the robot. The module is removably mounted into the frame while a new robot is contained within the module to provide the modular replacement of the robot.

11 Claims, 5 Drawing Sheets

SELF-CONTAINED ROBOTICS MODULE FOR STORAGE LIBRARY

BACKGROUND OF THE INVENTION

1. Field of the Invention

The present invention relates generally to storage libraries for handling and storing media elements such as cartridges and for reading and writing to the media elements using media element players such as drives. More particularly, the present invention relates to a self-contained robotics module which facilitates modular replacement and removal of media element handling robotics into and out of a storage library.

2. Background Art

An automated data storage library generally includes media storage elements such as cartridges, media element players such as drives, and media element handling components such as a media element handling robot assembly. The library includes individual cells which hold respective cartridges. The robot assembly includes a picker which is operable to move about the library and selectively load a cartridge from a cell into a drive. The picker is generally operable to remove cartridges from the cells and drives and load cartridges into the cells and drives.

Certain storage library designs enable the libraries to be expandable for capacity upgrades. Many storage library expansion solutions require complex installation techniques at the library user's site. Some solutions require costly robot assembly duplication, while other solutions require skilled personnel to link existing robot assemblies with the expansion mechanics. It would be desirable if storage library capacity expansion did not require manipulation, addition, modification, etc., to the robot assembly already part of the storage library.

In a typical storage library the hardware components of the robot assembly are distributed in various areas of the storage library. As such, if the robot assembly malfunctions then someone with a technical understanding of the storage library, such as a service engineer, is needed to locate and fix the malfunction. The service engineer is required because the storage library may need to be dismantled in order to find and fix the malfunction.

U.S. Pat. No. 5,870,245 discloses an example of a storage library in which media element handling robotics are distributed across various parts of the storage library. The disclosed storage library includes storage library modules vertically stacked within a rack. Each storage library module is fully enclosed within its own metal enclosure. The enclosures mount within respective spacings in the rack.

Inside its enclosure, each storage library module includes a drive shaft for moving a picker of the robot assembly within the storage library module. The rear of the enclosures are configured to form a U-shaped channel along their height. A pulley system placed within the U-shaped channel moves the picker to and from the drive shafts of the storage library modules in order to move the picker amongst the storage library modules.

As such, the robot assembly of the storage library includes the picker, the pulley system placed within the U-shaped channel running along the vertical stack, and the drive shafts contained in the storage library modules. Thus, the robot assembly components are distributed across various parts of the storage library.

As indicated above, the distribution of the robot assembly components in various parts of the storage library is a problem because an error in the robot assembly may be anywhere within the storage library. For instance, the pulley system may not work, a drive shaft in a storage library module may have a problem, the picker may by malfunctioning, etc. As a result, someone with the capability of being able to dismantle and work inside the storage library, such as a service engineer, would be required to locate and fix the error.

Robot assembly components are some of the most frequently replaced components of a storage library. Consequently, requiring a service engineer to replace these components becomes expensive during the life of the storage library. It would be desirable if all of the robot assembly components were containable within a module located in one area of the storage library with this module enabling modular replacement and removal of all of the robot assembly components into and out of the storage library.

Another problem with the storage library disclosed in U.S. Pat. No. 5,870,245 is that capacity upgrades require additional robot assembly hardware. For example, the storage library of U.S. Pat. No. 5,870,245 is vertically expandable by inserting additional storage library modules into a rack. Each additional storage library module adds capacity to the storage library by adding more cartridges and/or drives. The storage library is at full capacity when the rack is full of storage library modules and cannot receive anymore. As noted above, each storage library module includes a picker drive shaft and the rear of the enclosures form a U-shaped channel which must be aligned. The pulley system may also have to be replaced with a larger pulley to support a capacity upgrade. As such, a capacity upgrade necessitates adding additional robot assembly hardware. It would be desirable if a capacity upgrade to a storage library did not require adding additional robot assembly hardware.

SUMMARY OF THE INVENTION

Accordingly, it is an object of the present invention to provide a self-contained robotics module which facilitates modular replacement and removal of media element handling robotics into and out of a storage library.

It is another object of the present invention to provide a storage library having a self-contained robotics module which facilitates modular replacement and removal of media element handling robotics into and out of the storage library.

It is a further object of the present invention to provide a self-contained robotics module which can be plugged in and out of a spacing within a frame of a storage library in order to provide modular replacement and removal of media element handling robotics into and out of the storage library.

It is still another object of the present invention to provide a robotics module having a media element handling robot assembly for use in a storage library in which the robot assembly is fully containable within the robotics module to facilitate modular replacement and removal of the robot assembly into and out of the storage library.

It is still a further object of the present invention to provide a robotics module having a media element handling robot assembly for use in a storage library in which the robot assembly is fully containable within the robotics module and is movable out of the robotics module to access cartridges and/or drives of the storage library when the robotics module is mounted to a frame of the storage library with the robotics module being removably mountable to the storage library frame in a modular manner.

In carrying out the above objects and other objects, the present invention provides a storage library. The library includes a frame and media element holding cells supported within the frame. The library further includes a robot assembly operable for moving toward the cells and manipulating media elements held by the cells. The robot assembly is containable within a module which is removably mountable to the frame in order to provide modular replacement and removal of the robot assembly into and out of the frame.

The robot assembly is contained within the module as the module is mounted to the frame. The robot assembly is operable to move out from its contained position within the module in order to move toward the cells and manipulate media elements held by the cells while the module is mounted to the frame. The module is removably dismounted out of the frame while the robot assembly is contained within the module to provide the modular removal of the robot assembly from the frame. The module is removably mounted into the frame while a new robot assembly is contained within the module to provide the modular replacement of the robot assembly into the frame.

The module is removably mountable to front and back sides of the frame and is removably mountable to the frame independent of the support provided by the frame to the cells.

The library may further include a drive supported in the frame for receiving a media element. In this event, the robot assembly is operable to load a media element held by a cell into the drive.

Also, in carrying out the above objects and other objects, the present invention provides a robotics module for a storage library having media element holding cells supported within a frame. The robotics module includes a housing which is removably mountable to the frame of the storage library. The robotics module further includes a robot assembly containable within the housing. The robot assembly is operable to move out from its contained position within the housing in order to move toward the cells and manipulate media elements held by the cells while the housing is mounted to the frame.

Further, in carrying out the above objects and other objects, the present invention provides a method for a storage library having a plurality of media element holding cells supported within a frame. The method includes providing a robotics module having a robot assembly contained in a housing. The robot assembly is operable to move out from its contained position within the housing in order to move toward the cells and manipulate media elements held by the cells while the housing is mounted to the frame. The method further includes mounting the housing to the frame.

The method may also include dismounting the housing out of the frame while the robot assembly is contained in the housing in order to provide modular removal of the robot assembly from the frame.

In this event, the method may further include providing a new robot assembly in the housing and mounting the housing into the frame while the new robot assembly is contained in the housing to provide the modular replacement of the robot assembly. Alternatively, in this event, the method may include providing a new robotics module having a new robot assembly contained in a new housing and mounting the new housing into the frame while the new robot assembly is contained in the new housing to provide the modular replacement of the robot assembly.

The advantages associated with the present invention are numerous. For instance, all of the hardware components of the media element handling robot assembly are fully contained within a self-contained robotics module as opposed to being distributed across various parts of the storage library. The robotics module can be plugged into and out of a frame of the storage library. As such, a user can remove the entire robot assembly from the storage library upon a robot assembly malfunction by removing the robotics module. The user can then replace the malfunctioned robot assembly with a new robot assembly by plugging a new robotics module into the frame of the storage library. As the robotics module containing the malfunctioned robot assembly is removable from the frame of the storage library, it may be fixed and corrected without requiring physical entry into the storage library. The corrected robotics module can then be plugged back into the frame of the storage library. Furthermore, the self-contained robotics module enables cartridge and/or drive capacity of the storage library to be added without adding additional robot assembly hardware components to the storage library for the capacity upgrade.

DETAILED DESCRIPTION OF THE PREFERRED EMBODIMENT(S)

Figure 1:
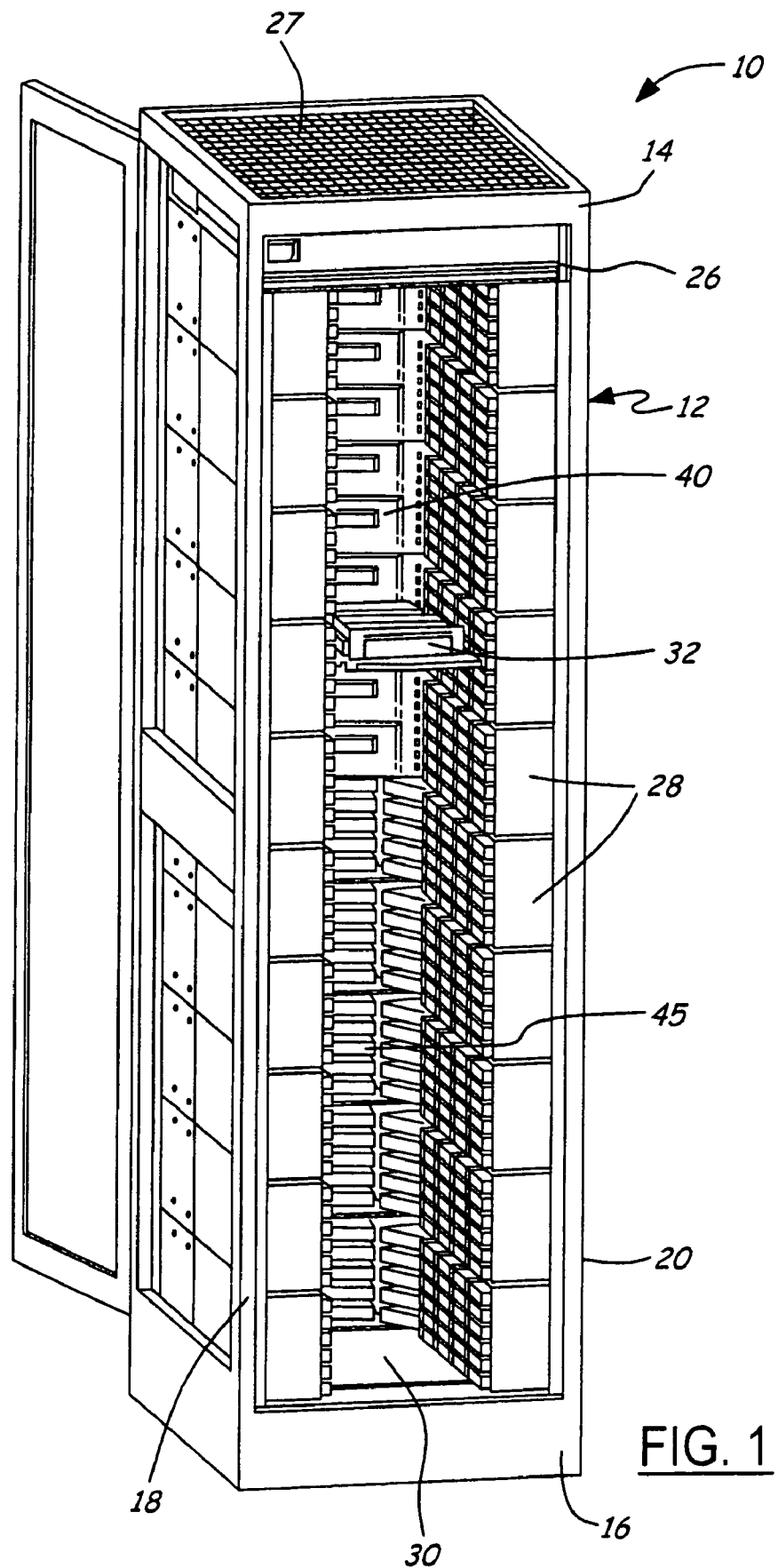
FIG. 1 illustrates a perspective view of a rack-mounted storage library in accordance with a preferred embodiment of the present invention.
Figure 2:
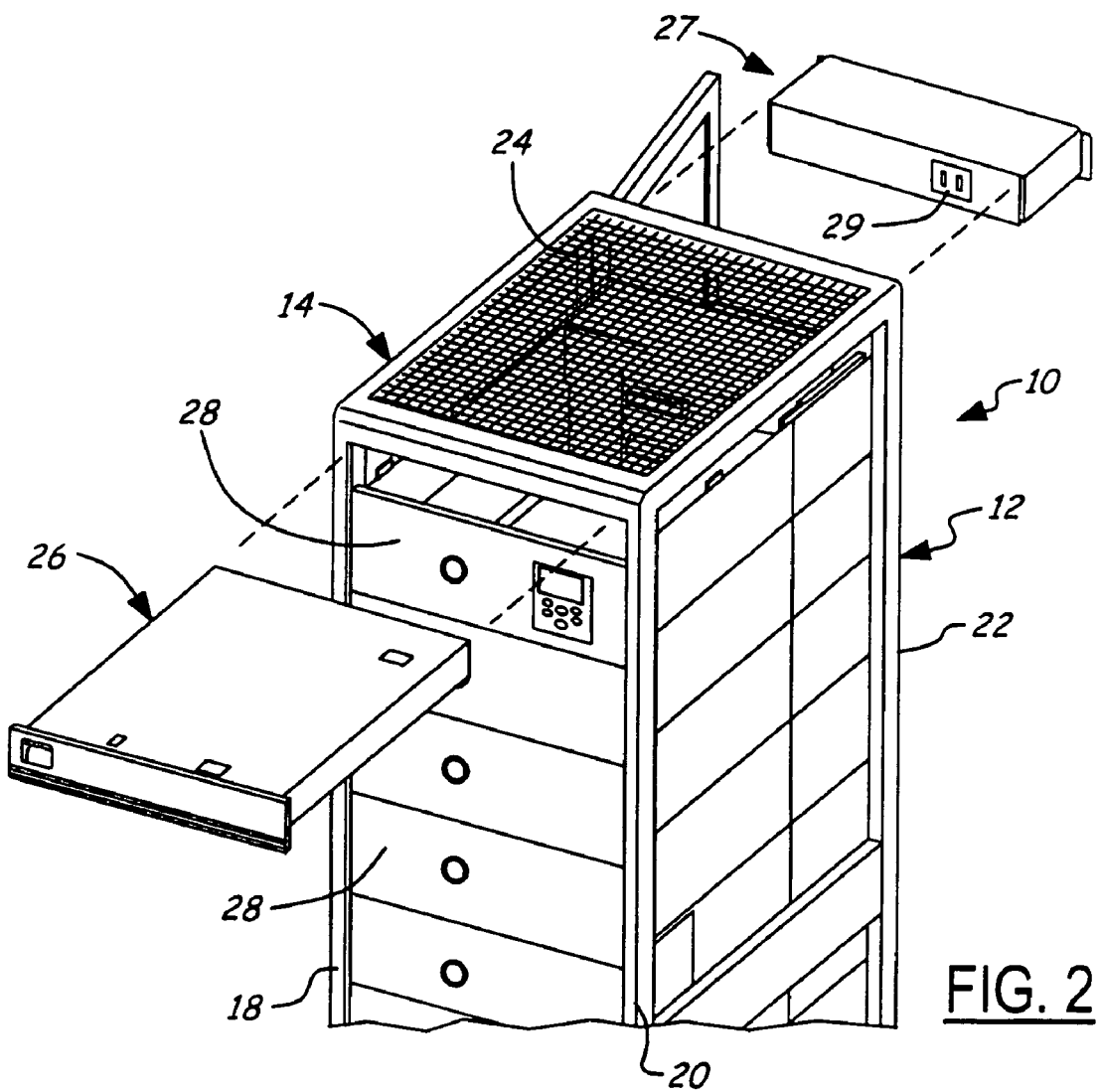
FIG. 2 illustrates a top view of the rack-mounted storage library with a self-contained robotics module and a controller module both being removed out of the rack of the storage library.

Referring now to FIGS. 1 and 2, a rack-mounted storage library 10 in accordance with a preferred embodiment of the present invention is shown. Storage library 10 is a data storage and retrieval system for a computer and is designed for handling and storing media elements such as cartridges and for reading and writing to the media elements using media element players as drives. A media element denotes any physical substrate suitable for storing data. A media element player is a reader and/or writer, i.e., a drive, which translates the data stored on a media element into signals readable by the computer for reading operations and/or writes data to the media element in response to a command from the computer for writing operations.

Storage library 10 includes a rack (e.g., frame) 12. Rack 12 has a vertically upright, rectangular form formed by top and bottom rack portions 14 and 16 and four legs 18, 20, 22, and 24 extending therebetween. Legs 18, 20, 22, and 24 are placed at respective corners of top and bottom rack portions 14 and 16. Legs 18, 20, 22, and 24 form a rectangular interior within rack 12. Bottom rack portion 16 is placed on a support structure such as a floor to support the weight of storage library 10.

A self-contained media element handling robotics module 26 is positioned within the interior of rack 12 preferably adjacent to top rack portion 14. Robotics module 26 is an integrated replaceable unit which contains media element handling robotics. Robotics module 26 can be plugged into and plugged out of a spacing within rack 12 of storage library 10 in a modular manner. Robotics module 26 may be removed and installed from the front and back sides of rack 12 of storage library 10. As shown in FIG. 1, robotics module 26 is plugged into rack 12 within its respective spacing of the interior formed by the rack. As shown in FIG. 2, robotics module 26 is plugged out from rack 12. As such, robotics module 26 facilitates modular replacement and removal of the media element handling robotics into and out of storage library 10.

A power/controller module 27 is positioned within the interior of rack 12 preferably adjacent to both top rack portion 14 and robotics module 26 when the robotics module is positioned within the rack. Power/controller module 27 includes a power supply for supplying the power required by the media element handling robotics of robotics module 26. Power/controller module 27 includes control electronics for generating electrical control signals to control the operation of the media element handling robotics of robotics module 26. Power/controller module 27 can be plugged into and plugged out of its spacing within rack 12. As shown in FIG. 1, power/controller module 27 is plugged into rack 12 within its respective spacing. As shown in FIG. 2, power/controller module 27 is plugged out from rack 12.

Robotics module 26 and power/controller module 27 are electrically connected to one another when both modules are mounted in rack 12. Robotics module 26 and power/controller module 27 include corresponding self-mating plug-connectors 29 on their back sides which plug into one another in order to connect these modules together.

Storage library 10 includes a plurality of storage library modules 28. Storage library modules 28 are positioned within the interior of rack 12. Rack 12 receives each storage library module 28 within a respective spacing provided by the rack. Storage library modules 28 include media elements 45 such as cartridges and/or includes media element players 40 such as drives. Cartridges 45 are individually supported within housing cells in storage library modules 28. Drives 40 are operable to read and write data to cartridges 45 when the cartridges are loaded into the drives.

FIG. 1 illustrates storage library 10 having a storage library module 28 positioned in each available storage library spacing provided by rack 12. Storage library modules 28 are removably connected to and supported by legs 18, 20, 22, and 24. Storage library modules 28 are in a vertical stack and form a continuous channel 30 along their height. Robotics module 26 is positioned above the vertical stack of storage library modules 28. The capacity of storage library 10 may be expanded by inserting storage library modules 28 into rack 12 of the storage library. Similarly, the capacity of storage library 10 may be reduced by removing storage library modules 28 from rack 12 of the storage library.

As indicated above, robotics module 26 includes media element handling robotics, i.e., a media element handling picker assembly 32. Picker assembly 32 is self-containable within robotics module 26. Picker assembly 32 is operable to drop out from robotics module 26 and then move amongst storage library modules 28 by moving up-and-down through channel 30. Picker assembly 32 is operable to selectively grab a cartridge 45 from a cell of one storage library module 28 and then move this cartridge to another location in this storage library module or to any location in the other storage library modules.

In particular, picker assembly 32 is operable to move to a cell holding a desired cartridge 45, engage the desired cartridge and remove it from its cell, move the desired cartridge to a location adjacent to a selected drive 40, and then load the desired cartridge into the selected drive. As noted above, drive 40 may be contained in a different storage library module 28. In this event, picker assembly 32 moves up or down along channel 30 from storage library module 28 containing the desired cartridge 45 to the storage library module containing the desired drive 40. As such, picker assembly 32 is operable to grab a cartridge 45 from a first storage library module 28 located at one end of the stack, move the cartridge along channel 30 to a second storage library module 28 located at the other end of the stack, and load the cartridge into a drive 40 (or another cell) of the second storage library module.

Storage library modules 28 do not contain media element handling robotics. Robotics module 26 provides the media element handling robotics (i.e., picker assembly 32) required for handling the cartridges in storage library modules 28. Picker assembly 32 may include a reader for reading labels on cartridges 45 and drives 40 of storage library modules 28 in order to keep track of the location of the contents of storage library 10.

Figure 3:
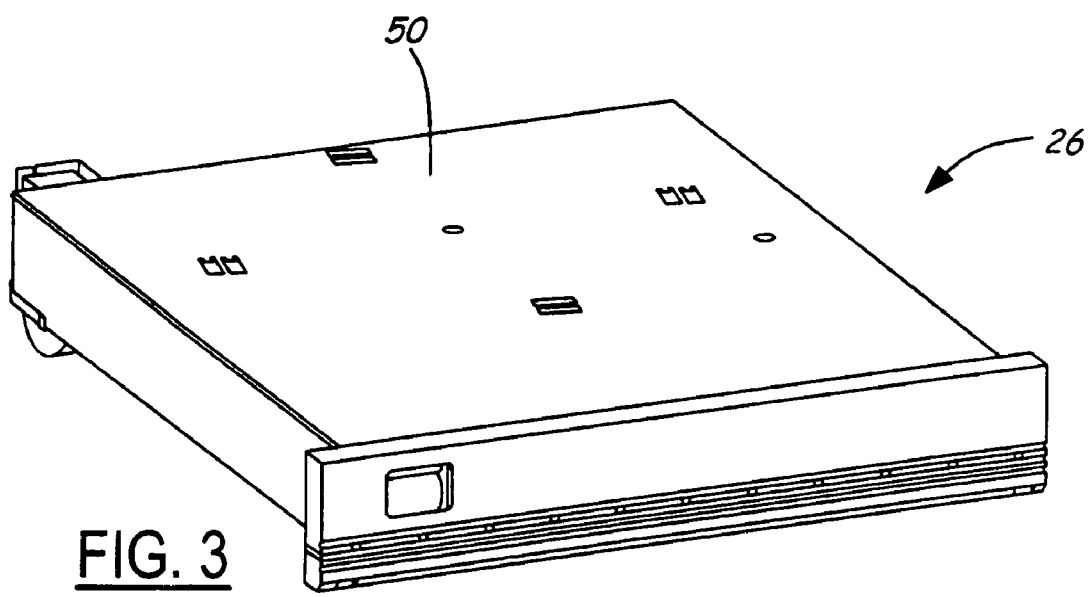
FIG. 3 illustrates a top-side perspective view of the self-contained robotics module in which a media element handling robot assembly is fully recessed within the robotics module and a communications cable is fully retracted within the robotics module.
Figure 4:
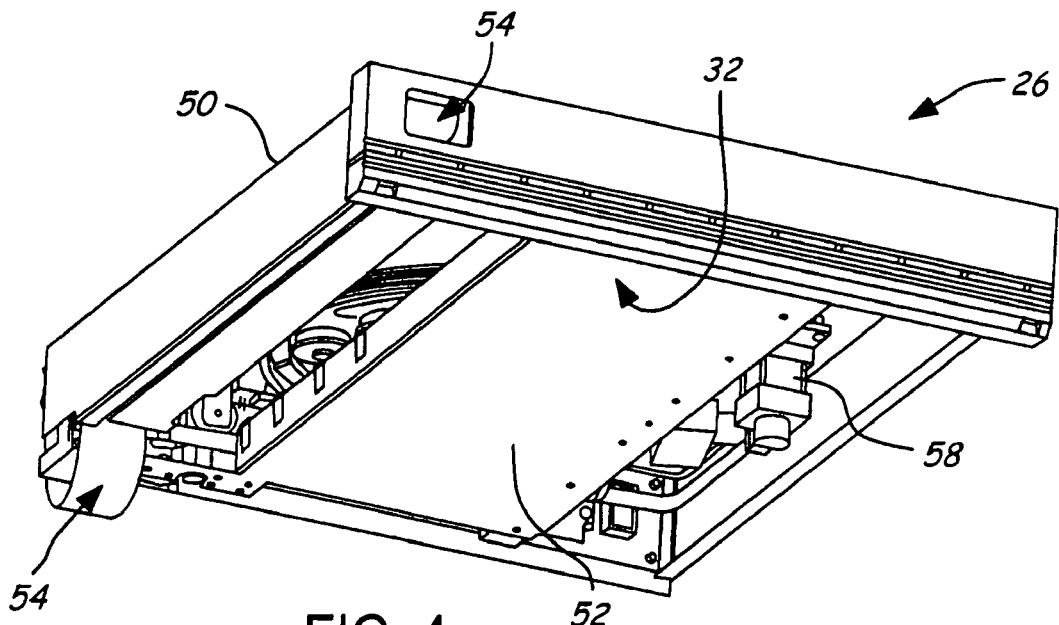
FIG. 4 illustrates a bottom-side perspective view of the self-contained robotics module with the media element handling robot assembly being fully recessed within the robotics module and the communications cable being fully retracted within the robotics module.

Referring now to FIGS. 3, 4, 5, 6, and 7, self-contained robotics module 26 will now be described in greater detail. FIGS. 3 and 4 respectively illustrate top and bottom side perspective views of robotics module 26. In FIGS. 3 and 4, picker assembly 32 is fully recessed within a housing 50 of robotics module 26 and an electronics communications cable 54 is fully retracted within the robotics module. Picker assembly 32 includes a platform 52. Platform 52 is shown in FIG. 4 as being fully recessed along a bottom-side of housing 50.

When picker assembly 32 is in the fully recessed position within housing 50 of robotics module 26 and communications cable 54 is fully retracted within the robotics module, the robotics module can be removably plugged into and pulled out from its respective spacing in rack 12 of storage library 10. Removing robotics module 26 from rack 12 of storage library 10 effectively removes all of the media element handling robotic assembly hardware out of storage library 10. Similarly, plugging robotics module 26 into rack 12 of storage library 10 effectively adds all of the media element handling robotic assembly hardware to the storage library.

Figure 7:
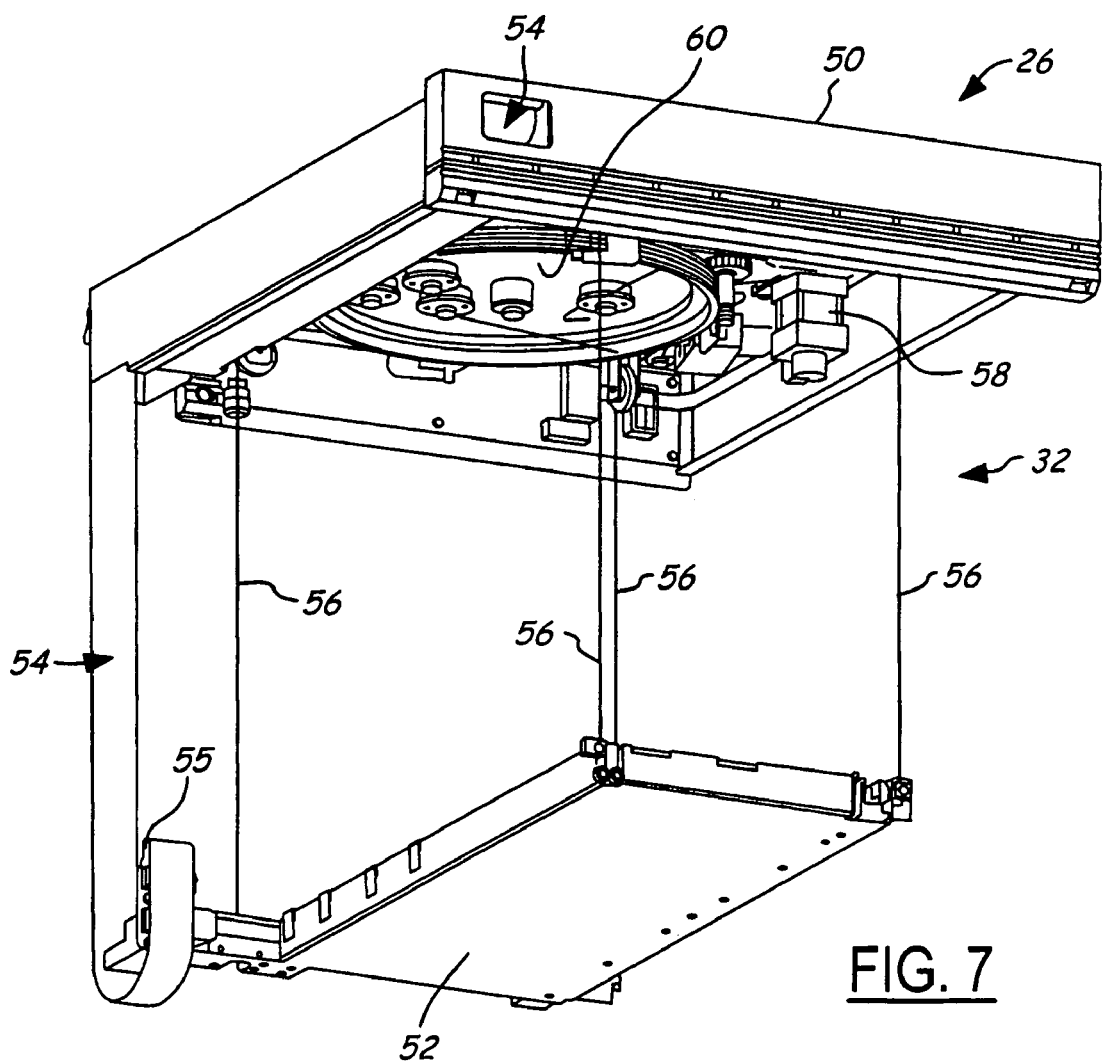
FIGS. 6 and 7 illustrate bottom-side perspective views of the robotics module with the media element handling robot assembly being moved out from its recessed position within the robotics module and the communications cable being extended out from the robotics module.
Figure 5:
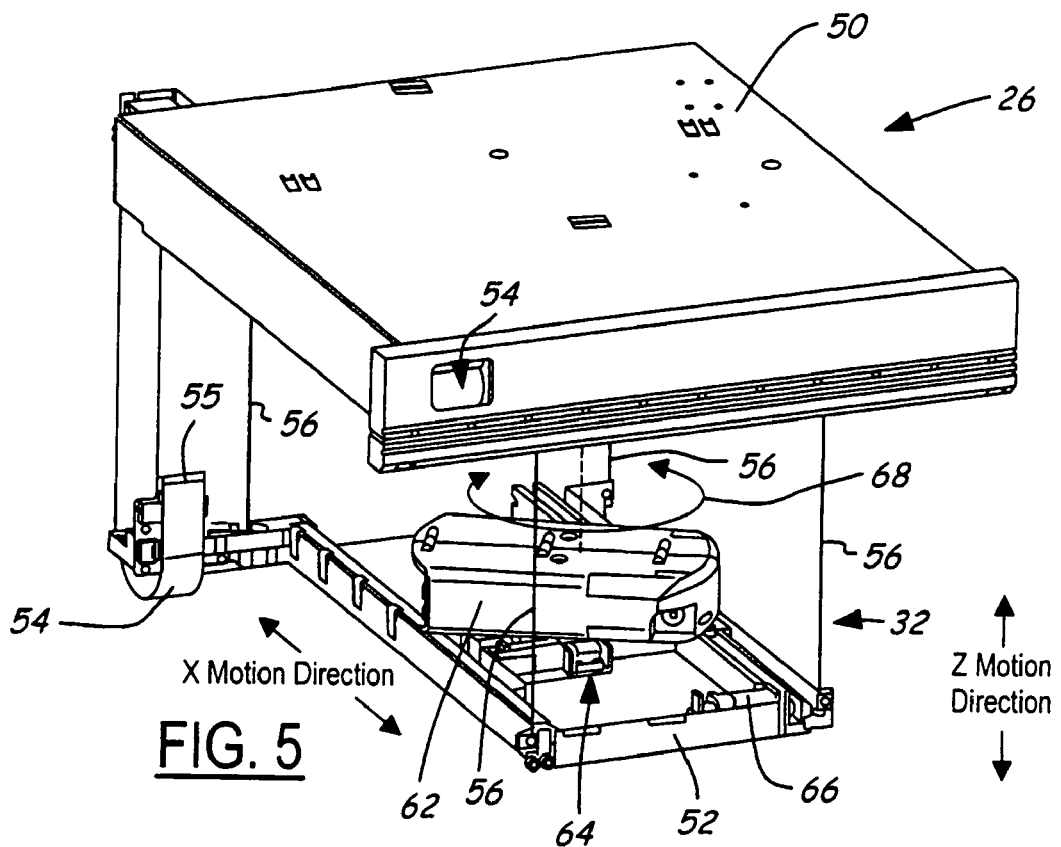
FIG. 5 illustrates a top-side perspective view of the robotics module with the media element handling robot assembly being moved out from its recessed position within the robotics module and the communications cable being extended out from the robotics module.
Figure 6:
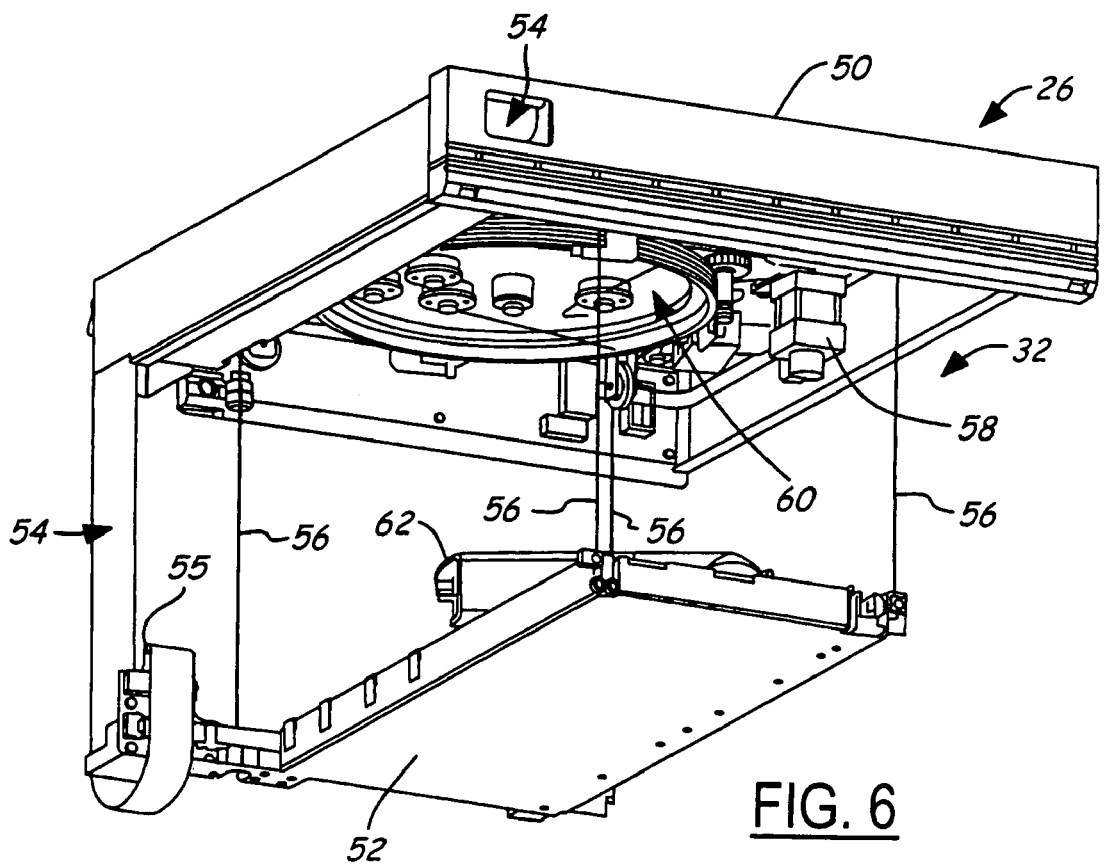

FIGS. 5, 6, and 7 illustrate top and bottom side perspective views of robotics module 26 with picker assembly 32 and its platform 52 being dropped down out from housing 50. A portion of communications cable 54 is extended out from robotics module 26. Communications cable 54 has a controller card connected at one end 55 to platform 52. As will be described in greater detail below, communications cable 54 enables electronic communication between an external device such as power/controller module 27 and picker assembly 32.

Picker assembly 32 includes four suspension cables 56 which are connected at each corner of platform 52. Suspension cables 56, such as steel rope cables, are fully wound up when platform 52 is fully recessed within housing 50. Suspension cables 56 unwind to lower platform 52 out from housing 50, and, as a result, the platform moves down along a z-direction as the suspension cables unwind. Similarly, platform 52 moves up along the z-direction as the suspension cables wind up from an unwound position.

Robotics module 26 includes a z-drive motor 58 for winding and unwinding suspension cables 56. Z-drive motor 58 drives a suspension cable wheel 60 in order to wind and unwind suspension cables 56. Suspension cables 56 are fully wound around wheel 60 when platform 52 is fully recessed within housing 50. Similarly, suspension cables 56 unwind from wheel 60 as platform 52 is lowered out from housing 50. Z-drive motor 58 is in communication with an external device such as power/controller module 27 for receiving commands to control the z-direction movement of platform 52.

Communications cable 54 releases from housing 50 of robotics module 26 as platform 52 is lowered out from the housing. As first end 55 of communications cable 54 is connected to platform 52, the platform pulls the communications cable out from housing 50 as the platform moves away from the housing in the z-direction along channel 30 formed by storage library modules 28. During operation, platform 52 will eventually move away from housing 50 to the extent of the maximum expansion of storage library 10, i.e., the platform will move to the lowest storage library module 28 in the vertical stack. The maximum extension of platform 52 away from robotics module 26 sets the length of the portion of communications cable 54 extending out from housing 50 of the robotics module.

Picker assembly 32 further includes a picker hand assembly 62 supported on a carriage assembly 64 movably connected to platform 52. Carriage assembly 64 is movable in an x-direction of motion along platform 52. An x-drive motor 66 drives carriage assembly 64 to move the carriage assembly along the x-direction. Hand assembly 62 moves in the x-direction of motion as carriage assembly 64 moves along the x-direction. Via communications cable 54, x-drive motor 66 is in communication with an external device such as power/controller module 27 for receiving commands to control the x-direction movement of carriage assembly 64.

Hand assembly 62 is also supported on carriage assembly 64 to be rotatable in a wrist direction of motion 68. Via communications cable 54, hand assembly 62 is in communication with an external device such as power/controller module 27 for receiving commands to control the wrist direction movement of the hand assembly.

Accordingly, hand assembly 62 has three directions of motion. One, hand assembly 62 is rotatable in the wrist direction of motion 68. Two, carriage assembly 64 moves hand assembly 62 along the x-direction. Three, platform 52 moves hand assembly 62 along the z-direction.

Hand assembly 62 is movable in the z-direction of motion to travel up-and-down through channel 30 formed by storage library modules 28 in order to move up-and-down amongst the storage library modules and to move up-and-down amongst a particular storage library module. Hand assembly 62 is movable in the x-direction of motion to move across a storage library module. Hand assembly 62 is rotatable in the wrist direction of motion to move next to a cell and/or a drive in order to grab a cartridge from its cell and insert this cartridge into another cell and/or another drive.

As described, robotics module 26 contains a free-hanging media picker assembly 32. The free-hanging design of picker assembly 32 enables robotics module 26 to be self-contained. That is, there is no attachment at bottom rack portion 16 as would be required with a pulley system. Because picker assembly 32 has a free-hanging configuration, there is no complicated support or drive structure required for operation of the picker assembly. Accordingly, picker assembly 32 is not affected by capacity upgrades. For instance, adding capacity to storage library 10 entails adding cartridges and/or drives to the storage library but does not entail adding any more media element handling robotics hardware.

As a result, the capacity of storage library 10 can be expanded by simply adding storage library modules 28, not having media element handling robotics, at a position below robotics module 26. As indicated above, communications cable 54 has a sufficient length to support the maximum extent of picker assembly 32 along channel 30 formed by storage library modules 28 and, consequently, has a sufficient length to support the capacity expansion of storage library 10.

It is further noted that storage library 10 may remain operational while robotics module 26 is removed from the storage library. For example, in this case, drives 40 may still function to read and write to cartridges 45 mounted within the drives while robotics module 26 is dismounted out of rack 12 of storage library 10.

Figure 8:
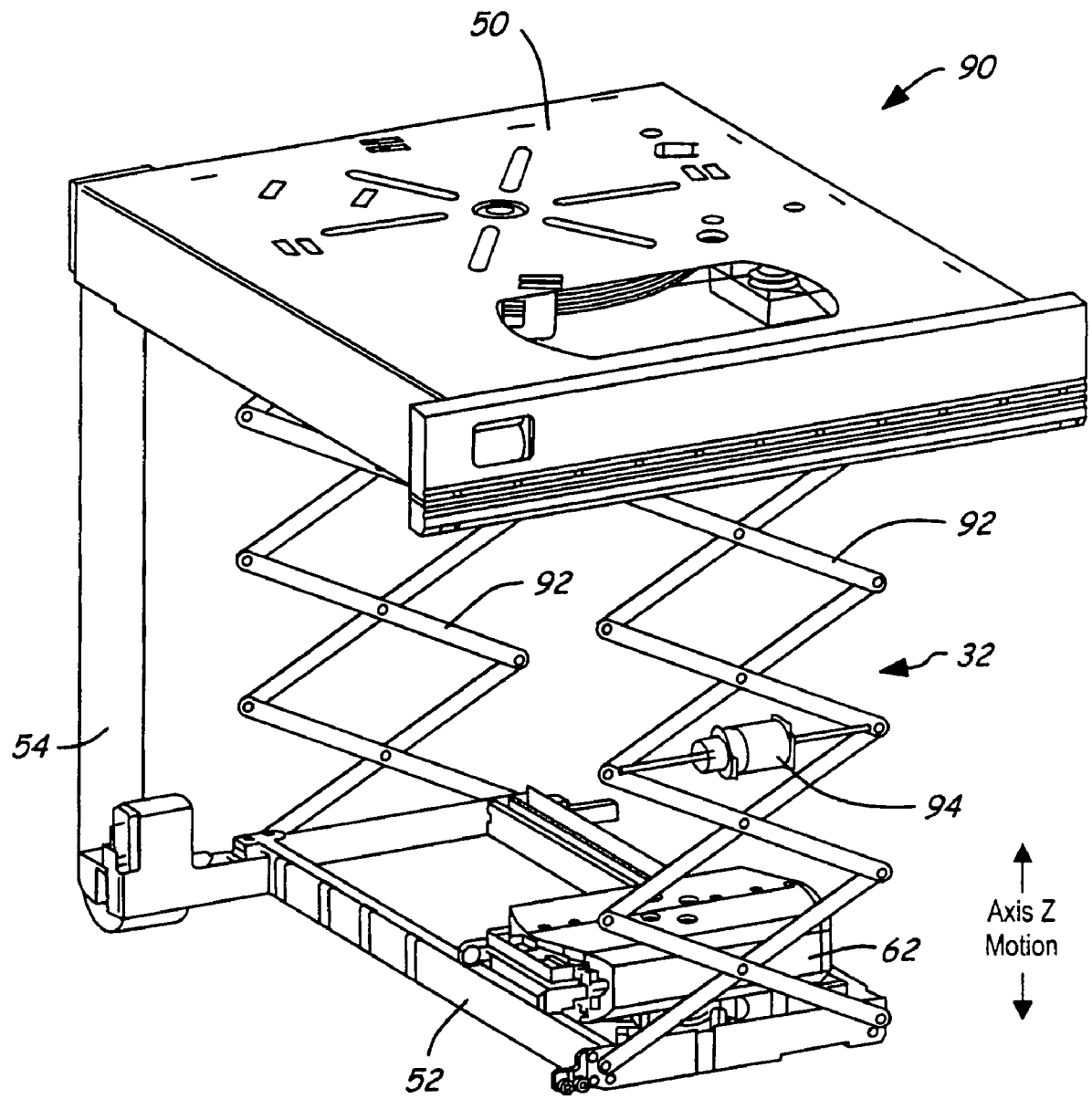
FIG. 8 illustrates a top-side perspective view of a self-contained robotics module in accordance with another embodiment with the media element handling robot assembly being moved out from its recessed position within the robotics module and the communications cable being extended out from the robotics module.

Referring now to FIG. 8, a top-side perspective view of a self-contained robotics module 90 in accordance with another embodiment is shown. Robotics module 90 includes many of the same elements as robotics module 26 and like components have the same reference numerals. In FIG. 8, picker assembly 32 is moved out from housing 50. Robotics module 90 includes two scissor mechanism legs 92 which are connected at each corner of platform 52. Legs 92 are fully contracted when platform 52 is fully recessed within housing 50. Legs 92 expand to lower platform 52 out from housing 50, and, as a result, the platform down moves along the z-direction as the legs expand. Similarly, platform 52 moves up along the z-direction as legs 92 contract from an expanded position. Robotics module 26 includes a z-drive actuator 94 for contracting and expanding legs 92.

It is noted that the configuration of robotics module 90 lends itself to be placed at other locations in rack 12 than being placed adjacent to top rack portion 14 as with robotics module 26. For instance, robotics module 90 may be effectively flipped upside down and placed near bottom rack portion 16. In this event, legs 92 expand to raise (as opposed to lower) platform 52 to move out from housing 50 and move upward (as opposed to downward) along the z-direction. Robotics module 90 may also be effectively placed on its side. In this case, legs 92 expand and contract to move side-to-side.

Thus, it is apparent that there has been provided, in accordance with the present invention, a self-contained robotics module which facilitates modular replacement and removal of media element handling robotics into and out of a storage library that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A storage library comprising:

a frame;

a plurality of cells supported within the frame for holding media elements, the cells positioned within the frame to form a channel running up and down through the frame; and a robotics module having a housing, a platform movably connected to the housing to move relative to the housing, and a picker supported on the platform;

wherein the robotics module is mounted to the frame such that the housing is supported by the frame and the platform is positioned within the channel to move up and down through the channel as the platform moves relative to the housing, wherein the platform is moved through the channel to move the picker through the channel and toward one of the cells for the picker to manipulate a media element held by the cell;

wherein the robotics module has a contained position in which the platform meets the housing such that the picker is contained between the housing and the platform, wherein while in the contained position the robotics module is dismountable from the frame in order to provide modular replacement and removal of the robotics module into and out of the frame.

2. The library of claim 1 wherein:

the robotics module is mounted to a front side of the frame.

3. The library of claim 1 wherein:

the robotics module is mounted to a back side of the frame.

4. The library of claim 1 wherein:

the robotics module is mounted to the frame independent of the support provided by the frame to the cells.

5. The library of claim 1 further comprising:

a drive supported in the frame and positioned adjacent to the channel for receiving a media element;

wherein the picker is operable to load a media element held by a cell into the drive.

6. The library of claim 1 further comprising:

a device having at least one of a power supply and a controller, the device having a plug-connector;

wherein the robotics module has a corresponding plug-connector, wherein the plug connectors connect with one another to connect the robotics module to the device while the robotics module is mounted to the frame.

7. A robotics module for a storage library having a plurality of cells supported within a frame for holding media elements with the cells being positioned within the frame to form a channel running up and down through the frame, the robotics module comprising:

a housing;

a platform movably connected to the housing to move relative to the housing; and a picker supported on the platform;

wherein the housing mounts to the frame such that the platform is positioned within the channel to move up and down through the channel as the platform moves relative to the housing, wherein the platform moves through the channel to move the picker through the channel and toward one of the cells for the picker to manipulate a media element held by the cell;

wherein the robotics module has a contained position in which the platform meets the housing such that the picker is contained between the housing and the platform wherein while in the contained position the robotics module dismounts from the frame to provide modular replacement and removal of the robotics module into and out of the frame.

8. The robotics module of claim 7 wherein:

the housing is mounted to a front side of the frame.

9. The robotics module of claim 7 wherein:

the housing is mounted to a back side of the frame.

10. The robotics module of claim 7 wherein:

the housing is mounted to the frame independent of the support provided by the frame to the cells.

11. The robotics module of claim 7 wherein the storage library further includes a drive supported in the frame and positioned adjacent to the channel for receiving a media element, wherein:

the picker is operable to load a media element held by a cell into the drive while the housing is mounted to the frame.

* * * * *